United States Patent
Altman et al.

(10) Patent No.: US 6,819,480 B2
(45) Date of Patent: Nov. 16, 2004

(54) METHOD AND APPARATUS FOR CONTROLLING THE EXTINCTION RATIO OF TRANSMITTERS

(75) Inventors: Lev Altman, Brooklyn, NY (US); Sonali Banerjee, Eatontown, NJ (US); Diego Fernando Grosz, Middletown, NJ (US); Stefan Hunsche, Jersey City, NJ (US); Taras Igorevich Lakoba, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 167 days.

(21) Appl. No.: 10/137,829

(22) Filed: May 2, 2002

(65) Prior Publication Data

US 2003/0206674 A1 Nov. 6, 2003

(51) Int. Cl.[7] .......................... H01S 3/00; H04B 10/00
(52) U.S. Cl. ................. 359/337.13; 398/188; 398/193; 398/198; 359/337.5; 359/341.4
(58) Field of Search ........................... 359/337–337.13, 359/337.5, 341.4; 398/188, 193, 198, 23, 158–159, 172, 192, 197, 201

(56) References Cited

U.S. PATENT DOCUMENTS

| 4,735,506 | A | * | 4/1988 | Pavlath | 356/464 |
|---|---|---|---|---|---|
| 5,309,269 | A | * | 5/1994 | Shibao | 398/197 |
| 5,373,383 | A | * | 12/1994 | LaGasse | 398/26 |
| 5,502,298 | A | * | 3/1996 | Geller | 250/205 |
| 5,515,196 | A | * | 5/1996 | Kitajima et al. | 398/185 |
| 5,608,561 | A | * | 3/1997 | Marcuse et al. | 398/192 |
| 5,706,116 | A | * | 1/1998 | Sugata | 398/182 |
| RE36,088 | E | * | 2/1999 | Kuwata et al. | 398/198 |
| 5,917,637 | A | * | 6/1999 | Ishikawa et al. | 398/197 |
| 6,088,147 | A | * | 7/2000 | Weber et al. | 359/237 |
| 6,178,032 | B1 | | 1/2001 | Huang et al. | 359/237 |
| 6,473,219 | B1 | * | 10/2002 | King | 359/245 |
| 6,563,622 | B2 | * | 5/2003 | Mueller et al. | 398/182 |
| 6,570,698 | B2 | * | 5/2003 | Kim et al. | 359/239 |
| 6,583,910 | B1 | * | 6/2003 | Satoh | 398/182 |
| 2002/0044322 | A1 | * | 4/2002 | Blumenthal et al. | 359/161 |
| 2003/0175037 | A1 | * | 9/2003 | Kimmitt et al. | 398/198 |

FOREIGN PATENT DOCUMENTS

WO     WO 02/071653 A2 *   9/2002

* cited by examiner

*Primary Examiner*—Evelyn A. Lester

(57) ABSTRACT

A method and apparatus for modifying the extinction ratio of a modulated optical signal by adapting a modulator driver signal in response to differences in spectral regions of the modulated optical signal. In another embodiment for modifying the extinction ratio of a modulated optical signal, a modulator signal is adapted in response to differences between a profile of the modulated optical signal and a desired profile.

23 Claims, 4 Drawing Sheets

150

METHOD AND APPARATUS FOR CONTROLLING THE EXTINCTION RATIO OF TRANSMITTERS

FIELD OF THE INVENTION

This invention relates to the field of optical communication systems and, more specifically, to the extinction ratios of transmitters.

BACKGROUND OF THE INVENTION

Extinction ratio is an important performance characteristic of laser transmitters used in optical communications systems. It is a measure of the amplitude of the digital modulation on the optical carrier and, therefore, affects the power penalty, or distance over which an optical fiber telecommunications system can reliably transmit and receive a signal. Standards for optical telecommunications systems, such as SONET, SDH, and Fibre Channel, specify minimum extinction ratio requirements for laser transmitters. Since extinction ratio is explicitly specified in these standards, it is important that any given laser transmitter, when its performance is measured on different test systems, yields a similar minimum extinction ratio value.

Another leading concern in optical communication systems is that the extinction ratio of a transmitter can be deteriorated by several factors, including temperature and amplifier response. If the extinction ratio becomes too small, an increase in noise results results in undesirable bit errors at an optical receiver detecting an output of the transmitter.

SUMMARY OF THE INVENTION

The present invention advantageously provides a method and apparatus for modifying the extinction ratio of a modulated optical signal by adapting a modulator driver signal in response to power level differences in spectral regions of the modulated signal.

In one embodiment of the invention, a method includes adapting an optical modulator driver signal to reduce a difference between a carrier frequency power level and a corresponding sideband power level.

In another embodiment of the invention, an optical modulation apparatus includes a modulator, for modulating an optical signal in response to a driver signal to produce a modulated optical signal having associated with it a carrier frequency power level and at least one sideband power level, and a controller, for adapting the driver signal in a manner tending to reduce differences between the carrier frequency and at least one sideband power level.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a method and apparatus for controlling the extinction ratio of transmitters. Optimizing the extinction ratio of a laser transmitter according to the method and apparatus of the present invention advantageously increases the distance over which an optical communications system can reliably transmit and receive a signal.

Figure 1:
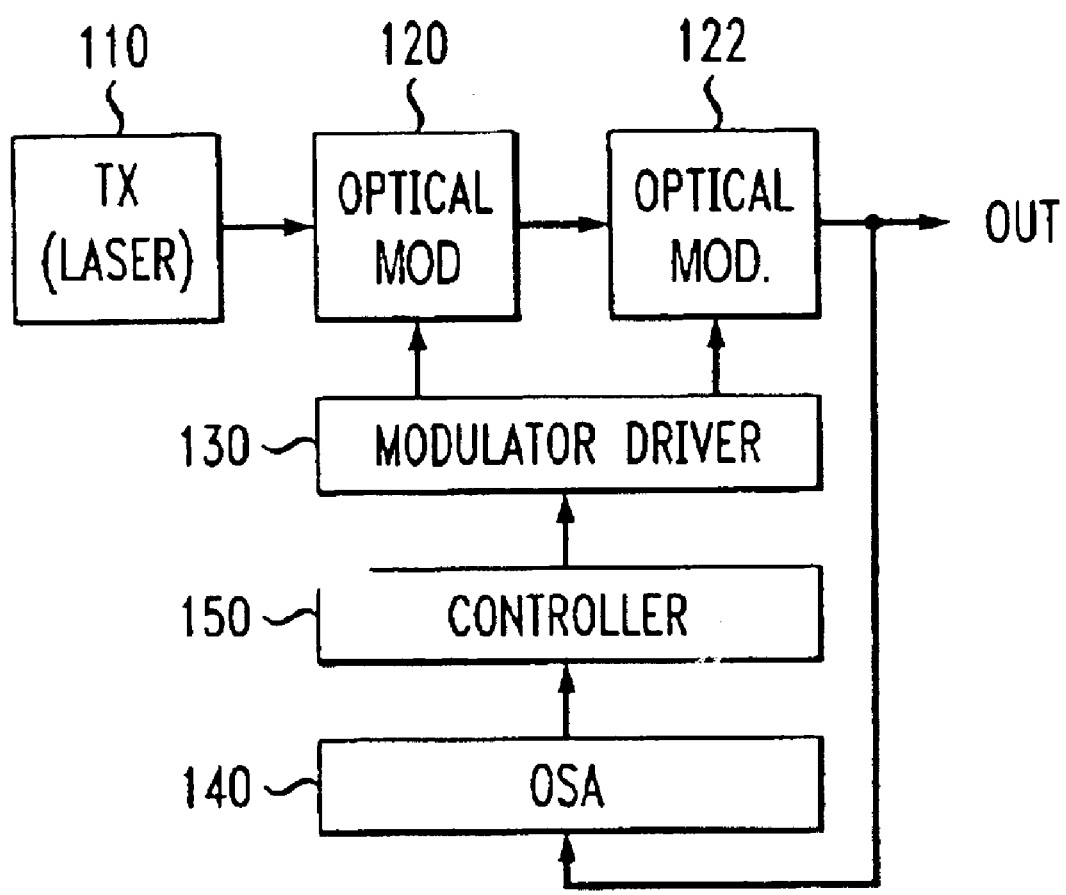
FIG. 1 depicts a block diagram of an optical modulation system 100 in accordance with the present invention, FIG. 2 graphically depicts an exemplary spectral diagram of relatively "good" and "bad" return-to-zero (RZ) pulses produced by an optical modulation system as in the system 100 of FIG. 1.

FIG. 1 depicts a block diagram of an optical modulation system 100. The optical modulation system 100 includes a transmitter 110 (illustratively a laser) for providing a continuous light source, two optical modulators 120 and 122 for modulating the continuous light source or the signal derived from the continuous light source in response to a control input or driver signal, a modulator driver 130 for providing the control input, or driver signal, for the optical modulators 120 and 122, an optical spectrum analyzer (OSA) 140 for determining an optical spectrum of a modulated output signal OUT, and a controller 150 for examining the determined optical spectrum and adapting the driver signal from the modulator driver 130.

An optical signal from the transmitter 110 is applied to the optical modulator 120 to be modulated. The signal from the optical modulator 120 is then applied to the first input of a second optical modulator 122, which then awaits a driver signal from the modulator driver 130 before transmitting any data. The driver signal from the modulator driver 130 determines the properties (amplitude, width, phase, etc) of the resulting modulated output signal OUT of the optical modulation system 100. In the first iteration of the present invention, the modulator driver 130 imparts a signal to the optical modulator 122 in order to achieve a desired modulated output signal OUT. The OSA 140 determines an optical spectrum of the resulting modulated output signal OUT of the optical modulator 120. The profile information determined by the OSA is utilized by the controller 150. Typical profile information determined by the OSA 140 includes an optical spectrum of the modulated output signal OUT, amplitude information, and the like. The controller 150 examines the profile information from the OSA 140 and provides a control signal to the modulator driver 130 relative to the examined optical spectrum. The modulator driver 130 receives the control signal from the controller 150 and in response provides a driver signal respective of the control signal from the controller 150, to the driver inputs of the optical modulators 120 and 122. Although some of the elements of system 100 in FIG. 1 are depicted as specific devices, other such devices that perform substantially similar functions as the specified elements can be substituted. For example, the OSA 140 of the system 100 of FIG. 1 can be an optical channel monitor (OMON). Additionally, although the controller 150 in the system 100 of FIG. 1 is depicted as a separate unit located before the modulator driver 130, the controller 150 may be advantageously configured in various formats. For example, the controller 150 may be located in the optical modulation system 100 after the modulator driver 130 or may be incorporated in the modulator driver 130 itself. Moreover, the controller 150, OSA 140 and/or modulator driver 130 may comprise a single element. Furthermore, although the system 100 of FIG. 1 is shown as comprising of two modulators, the present invention can be advantageously employed in systems containing fewer or more modulators.

Figure 2:
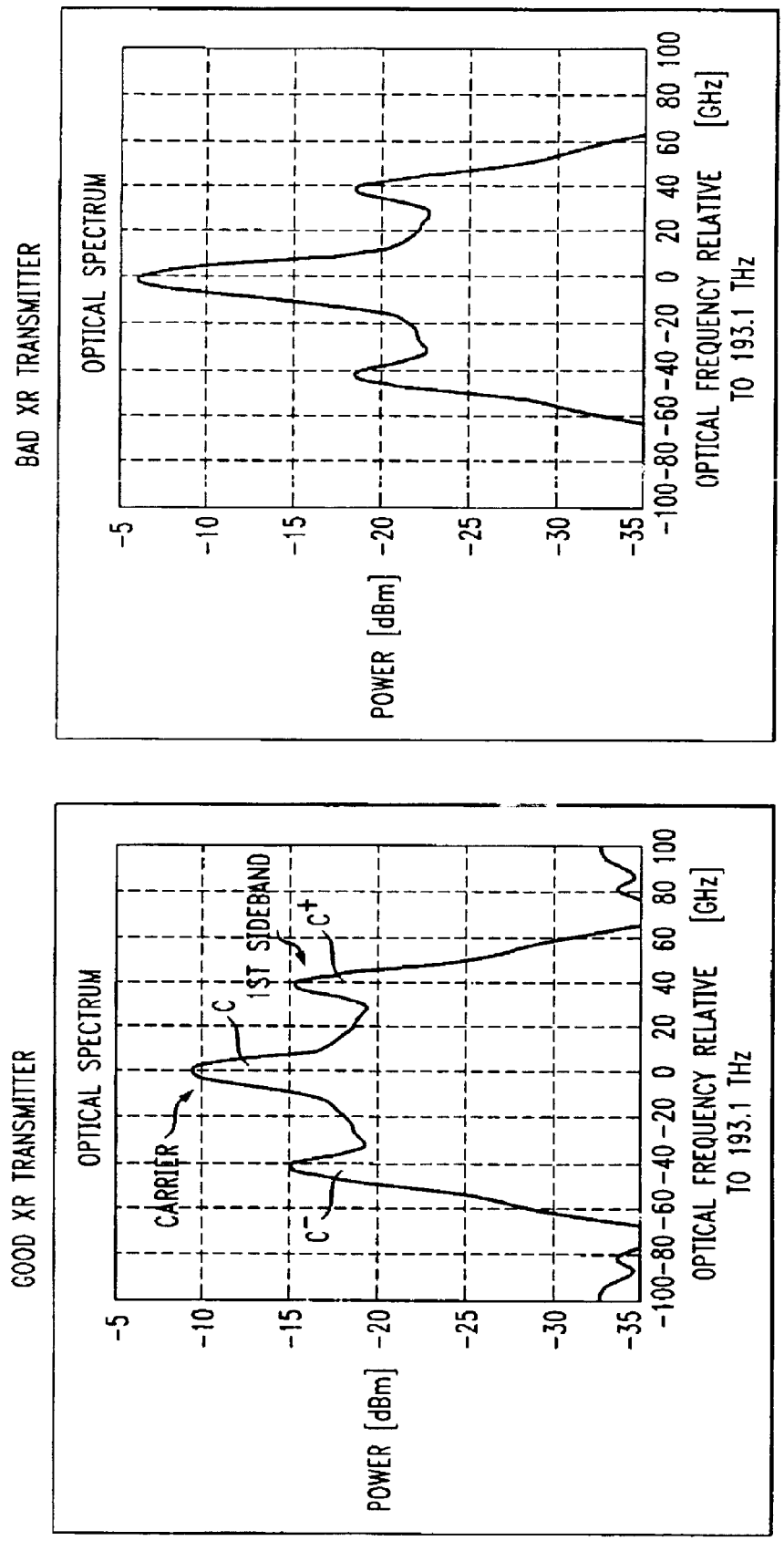

FIG. 2 graphically depicts an exemplary spectral diagram of relatively "good" and "bad" return-to-zero (RZ) pulses produced by an optical modulation system as in the system 100 of FIG. 1. Although the pulses in FIG. 2 are depicted as RZ pulses, the present invention can be advantageously employed in other modulation formats, such as a non-return-to-zero (NRZ) modulation systems, wherein the modulation format produces a modulated optical signal including a central carrier signal and spectral sidebands. As illustrated in FIG. 2, a continuous light source signal modulated by the optical modulation system 100 produces a modulated optical signal including a central carrier signal, C, and two spectral sidebands, $C^+$ and $C^-$, spectrally positioned on either side of the central carrier frequency at, respectively, plus and minus the bit rate of data modulated onto the central carrier frequency. Advantageously, the inventive method has no upper limit for extinction ratio (XR) characterization, even at very high bit rates, since a higher bit rate implies that the sidebands will be further apart. The power difference ($\Delta$) between the carrier signal C and a $1^{st}$ spectral sideband (illustratively the positive sideband $C^+$) has been determined by the inventors to be an indication of the quality of the extinction ratio (XR) of a transmitter, namely, the greater the power difference ($\Delta$), the worse the XR of a transmitter.

Although illustratively the positive sideband is used to determine the power difference between the carrier signal and a spectral sideband, the negative sideband may be advantageously employed for a similar purpose according to the principles of the present invention. Moreover, although illustratively one of the immediate spectral sidebands $C^+$ and $C^-$ is used to determine the ($\Delta$), in instances where harmonics of the spectral sidebands $C^+$ and $C^-$ exist, the harmonics may be advantageously used to determine a difference in power levels, though such difference is scaled accordingly.

Returning now to FIG. 1, information pertaining to the magnitude of the modulated output signal OUT is determined by the OSA 140 and is utilized by the controller 150. The controller 150 examines the information from the OSA 140 and responsively adapts the driver signal provided to the optical modulators 120 and 122 by the modulator driver 130. In this manner, the controller 150 utilizes the information provided by the OSA 140 to responsively adapt the magnitude of the driver signal communicated to the optical modulators 120 and 122 by the modulator driver 130 to produce an optimum XR profile (or other desired XR profile) of the modulated output signal OUT of the optical modulation system 100. In addition, the controller 150, in response to the magnitude information from the OSA 140, can also provide a signal to the modulator driver 130 to adjust the phase and or electrical delays of the optical modulators 120 and 122 to produce an optimum XR profile (or other desired XR profile) of the modulated output signal OUT of the optical modulation system 100. To state it differently, the XR profile can be optimized by adjusting the phase in between the two modulators 120 and 122 in response to an optical spectrum provided by the OSA 140.

Although the following iteration will be discussed mostly referring to adjusting the magnitude of the driver signal from the modulator driver 130, it will be appreciated to one skilled in the art that the present invention can be advantageously employed by adjusting the phase and or electrical delays of the optical modulators 120 and 122 to achieve a reduction in a determined ($\Delta$) between the carrier signal and a $1^{st}$ spectral sideband C+ or C− of the modulated output signal OUT. In an embodiment of the invention discussed below with respect to FIG. 4, the controller 150 examines spectral information from the OSA 140 and determines and records the power difference ($\Delta$) between the carrier signal and a $1^{st}$ spectral sideband C+ or C− of the modulated output signal OUT. The controller 150 then compares the newly recorded ($\Delta$) to an existing ($\Delta'$) recorded in the previous iteration. If a previous ($\Delta'$) does not exist (this is the case for a first iteration) then the controller 150 adjusts the magnitude (voltage or current) or phase of the driver signal from the modulator driver 130 intended for the optical modulator 120 in an attempt to reduce the determined ($\Delta$) between the carrier signal and a $1^{st}$ spectral sideband C+ or C− of the modulated output signal OUT. The controller 150 adjusts the magnitude of the driver signal either up or down in this first iteration and records the direction of the adjustment. The magnitude of the driver signal from the modulator driver 130 is adjusted by a predefined maximum for each iteration. In the next iteration, the controller 150 again examines and records a new ($\Delta$) of the modulated output signal OUT determined by the OSA 140 and then compares the newly recorded ($\Delta$) to an existing ($\Delta'$) recorded in the previous iteration. If the ($\Delta$) increased compared to the ($\Delta'$) of the previous iteration, the controller 150 then adjusts the magnitude of the driver signal from the modulator driver 130 in the opposite direction of the previous iteration (from increasing the voltage or current of the driver signal to decreasing the voltage or current of the driver signal or vice-versa) in an attempt to reduce the ($\Delta$) and improve the XR. If the ($\Delta$) decreased compared to the ($\Delta'$) of the previous iteration, then the controller 150 adjusts the driving voltage or current of the driver signal from the modulator driver 130 in the same direction as the previous iteration in an attempt to further decrease the ($\Delta$). The sampling rate and processing rate of the OSA 140 and the controller 150, respectively, can be configured to provide a wide range of update frequencies according to the sensitivity desired in the system. For example, the iterations of the OSA 140 and the controller 150 can be configured to run continuously or at a similar rate as the bit rate of the resulting pulses from the optical modulator 120. The invention can be advantageously implemented in a wide range of update frequencies, limited only by the actual components used; for example the optical modulator 120, the modulator driver 130, the OSA 140 and the controller 150. The controller 150 can also be configured to provide a wide range of scaling factors to be applied to the driver signal from the modulator driver 140. For example, the voltage or current from the modulator driver 130 can be scaled up or down by the controller 150 in fractions of the total driving voltage or current from the modulator driver 130 intended for the optical modulator 120.

In another embodiment of the invention, the controller 150 examines the spectral information from the OSA 140 and determines and records the power difference ($\Delta$) between the carrier signal and a $1^{st}$ spectral sideband C+ or C− of the modulated output signal OUT and a desired XR profile contained in the controller 150. The controller 150 then adjusts the electrical delay information (phase delays) from the modulator driver 130 intended for the optical modulators 120 and 122 in such a manner as to cause the difference between the determined XR profile and the desired XR profile to be reduced. The direction of the phase adjustment is recorded by the controller 150 to enable the controller 150 to improve the XR in subsequent iterations.

In another embodiment of the invention, a desired profile of the XR is recorded in a controller. The controller waits for an input from an OSA containing the spectral information of an output of an optical modulator. Upon receipt of an input from the OSA, the controller examines the information from the OSA and compares the determined optical spectrum (profile of the XR) to a desired profile of the XR contained in the controller. In response to a difference between the determined profile and the desired profile, the controller adapts a driver signal from the modulator driver intended for the optical modulator in a manner causing the difference to be reduced.

In another embodiment of the invention, the voltage and or current and of the driver signal and the phase information intended for an optical modulator are adapted simultaneously to produce an optimum XR (or other desired XR profile) from the transmitter.

Figure 3:
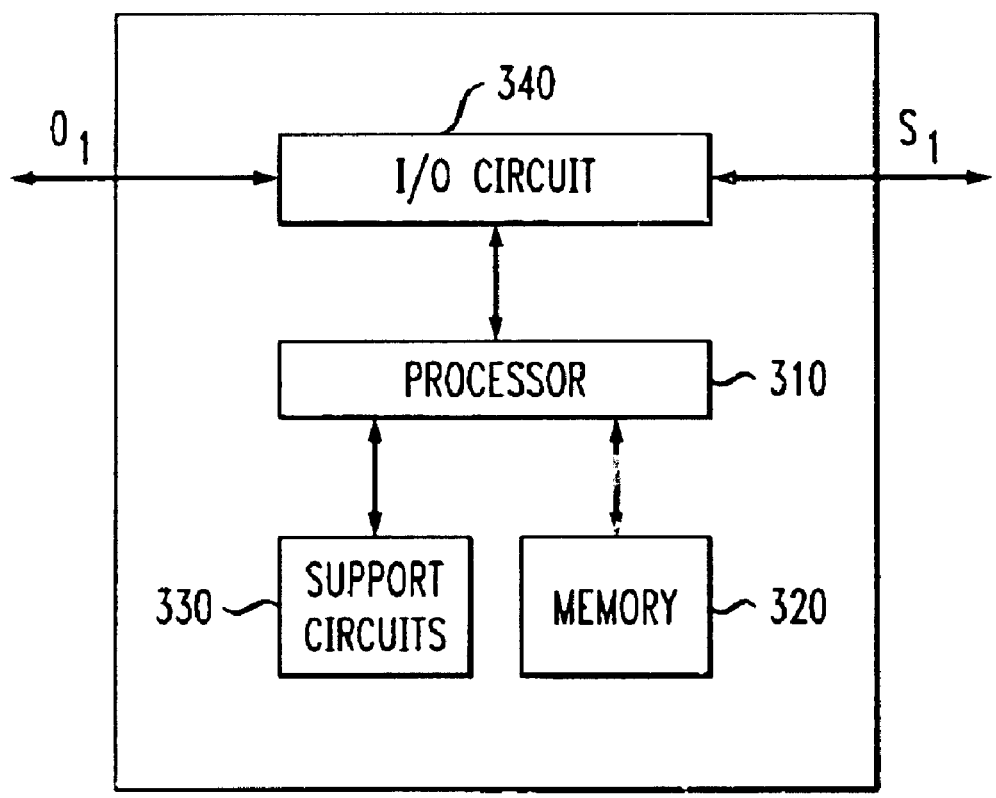
FIG. 3 depicts a high-level block diagram of one embodiment of a controller suitable for use in the optical modulation system 100 of FIG. 1.

FIG. 3 depicts a high-level block diagram of one embodiment of a controller suitable for use in the optical modulation system 100 of FIG. 1. The controller 150 of FIG. 3 comprises a processor 310 as well as a memory 320 for storing information and control programs The processor 310 cooperates with conventional support circuitry 330 such as power supplies, clock circuits, cache memory and the like as well as circuits that assist in executing the software routines stored in the memory 320. As such, it is contemplated that some of the process steps discussed herein as software processes may be implemented within hardware, for example, as circuitry that cooperates with the processor 310 to perform various steps. The controller 150 also contains input-output circuitry 340 that forms an interface between the various functional elements communicating with the controller 150. For example, in the embodiment of FIG. 1, the controller 150 communicates with the OSA 140 via a signal path S1 and to the modulator driver 130 via signal path O1. The controller 150 may also implement the functions of the OSA 150 and/or driven 130.

Although the controller 150 of FIG. 3 is depicted as a general-purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

Figure 4:
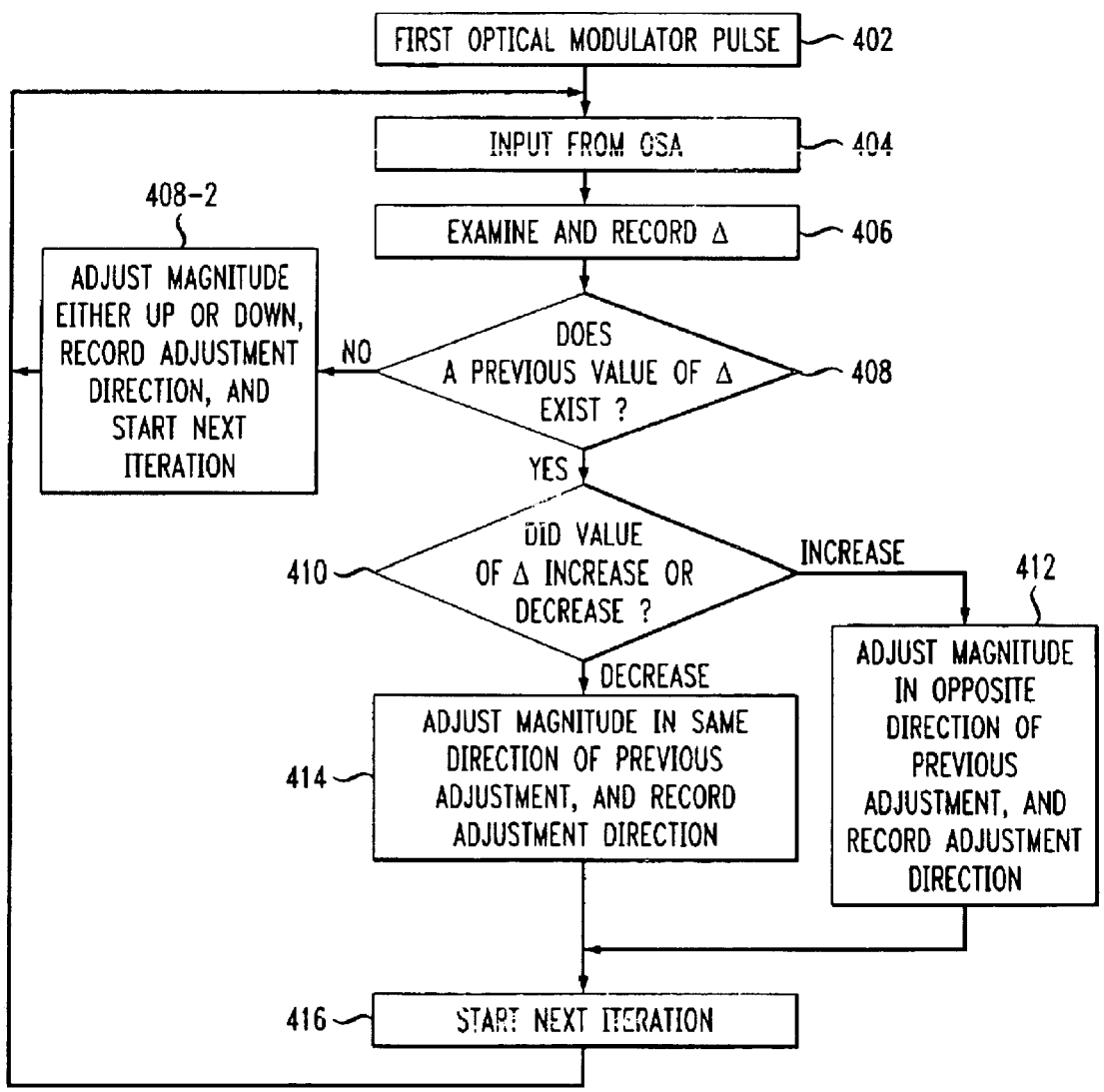
FIG. 4 depicts a flow diagram of one embodiment of a method for controlling the extinction ratio of transmitters.

FIG. 4 depicts a flow diagram of a method 400 for controlling the extinction ratio of transmitters. The method 400 uses spectral data produced by an OSA to control a driver signal supplied to optical modulators such that an optimum XR (or other desired XR profile) is imparted to a resulting modulated optical signal. Although the method 400 will be described within the context of dynamically controlling only a magnitude of a voltage or current signal applied to the optical modulators, it will be appreciated by those skilled in the art that the subject invention may be advantageously employed in methods where the magnitude and/or phase information intended for the optical modulators can be controlled individually or simultaneously to achieve a reduction in a determined Δ between the carrier signal and a $1^{st}$ spectral sideband C+ or C− of the modulated output signal OUT. That is, one or both of driver voltage or current magnitude and phase may be adapted according to the invention.

The method 400 is entered at step 402, where a first optical pulse is produced by the optical modulation system 100 of FIG. 1.

At step 404, the method 400 waits for an input. That is, at step 404 the controller 150 executing the method 400 waits for an input from the OSA 140.

At step 406, the method examines the information from the OSA 140 and records the power difference (Δ) between the carrier signal and a $1^{st}$ sideband of the carrier signal. The (Δ) between the carrier signal and a $1^{st}$ sideband has been determined by the inventors to be an indication of the quality of the extinction ratio (XR) of a transmitter; namely, the greater the (Δ), the worse the XR of the transmitter 110.

At step 408, the method 400 searches the controller 150 for a previously recorded value of (Δ) from a previous iteration, (Δ'). If a previous (Δ') does not exist (this is the case for a first iteration) then the method 400 proceeds to step 408-2 where the controller 150 adjusts the magnitude of the driver signal intended for the optical modulator 120 either up or down, records the direction of adjustment, and returns to step 404 where the method 400 waits for another input from the OSA 140. If a previously recorded value of (Δ) does exist, the method proceeds to step 410.

At step 410, the method 400 determines whether the value of the newly recorded (Δ) resulting from the operation of step 406 increased or decreased as compared to the previously recorded value (Δ') If the value of the newly recorded Δ increased with respect to the previously recorded value (Δ'), the method 400 proceeds to step 412. If the value of the newly recorded Δ decreased with respect to the previously recorded value (Δ'), the method 400 skips step 412 and proceeds to step 414.

At step 412, the method 400 adjusts the driver signal magnitude in the opposite direction as the adjustment of the previous iteration. The method 400 also records the direction of the adjustment performed in this step. The method 400 then skips step 414 and proceeds to step 416.

At step 414, the method 400 adjusts the driver signal magnitude in the same direction as the adjustment of the previous iteration. The method 400 also records the direction of the adjustment performed in this step. The method 400 then proceeds to step 416, where the start of the next iteration is initiated by returning to step 404

The above-described method 400 of FIG. 4 provides a general methodology according to the subject invention. As previously noted, although the method 400 will be described within the context of dynamically controlling only the magnitude of the driver signal from the modulator driver 130 intended for the optical modulator 120, it will be appreciated by those skilled in the art that the subject invention may be advantageously employed in methods where the magnitude and/or phase information intended for the optical modulator can be controlled individually or simultaneously to achieve a reduction in a determined Δ between the carrier signal and a $1^{st}$ spectral sideband C+ or C− of the modulated output signal OUT.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method, comprising:
   adapting an optical modulator driver signal to reduce a difference between a carrier frequency power level and a corresponding sideband power level.

2. The method of claim 1, wherein said adapting comprises adapting a magnitude parameter of said driver signal.

3. The method of claim 1, wherein said adapting comprises adapting a phase parameter of said driver signal.

4. The method of claim 1, wherein said adapting comprises adapting both of a magnitude parameter and a phase parameter of said driver signal.

5. The method of claim 1, wherein said step of adapting is iteratively performed until a minimum power level difference is achieved.

6. The method of claim 5, wherein said driver signal is changed by a predefined maximum for each iteration.

7. The method of claim 5, wherein at least one of a magnitude and phase parameter of said driver signal is adapted during each iteration.

8. The method of claim 5, wherein during a first iteration said driver signal is changed by a predetermined amount to cause an initial change in said power level difference.

9. A method comprising:

determining an optical spectrum of a modulated optical signal; and in response to a difference between said determined optical spectrum and a desired optical spectrum, adapting an optical modulator driver signal in a manner causing said difference to be reduced.

10. The method of claim 9, wherein said desired optical spectrum comprises a predetermined extinction ratio (XR) profile.

11. The method of claim 9, wherein the bit rate of an extinction ratio (XR) of said modulated optical signal is only limited by an analyzer used to record said bit rate.

12. The method of claim 9, wherein said adapting comprises adapting a magnitude parameter of said driver signal.

13. The method of claim 9, wherein said adapting comprises adapting a phase parameter of said driver signal.

14. The method of claim 9, wherein said adapting comprises adapting both of a magnitude parameter and a phase parameter of said driver signal.

15. An optical modulation apparatus, comprising:

a modulator, for modulating an optical signal in response to a driver signal to produce a modulated optical signal having associated with it a carrier frequency power level and at least one sideband power level; and a controller, for adapting said driver signal in a manner tending to reduce differences between said carrier frequency and at least one sideband power level.

16. The optical modulation apparatus of claim 15, wherein said adapting comprises adapting a magnitude parameter of said driver signal.

17. The optical modulation apparatus of claim 15, wherein said adapting comprises adapting a phase parameter of said driver signal.

18. The optical modulation apparatus of claim 15, wherein said adapting comprises adapting both of a magnitude parameter and a phase parameter of said driver signal.

19. The optical modulation apparatus of claim 15, wherein said differences are reduced to cause a measured optical signal spectral region to approximate a desired optical signal spectral region.

20. The optical modulation apparatus of claim 19, wherein said desired optical signal spectral region is indicative of a predetermined extinction ratio (XR) profile.

21. The optical modulation apparatus of claim 15, wherein the bit rate of an extinction ratio (XR) of said modulated optical signal is only limited by an analyzer used to record said bit rate.

22. Computer-readable medium for storing a set of instructions which, when executed by a processor, perform a method comprising:

adapting an optical modulator driver signal to reduce a difference between a carrier frequency power level and a corresponding sideband power level.

23. Computer-readable medium for storing a set of instructions which, when executed by a processor, perform a method comprising:

determining an optical spectrum of a modulated optical signal; and in response to a difference between said determined optical spectrum and a desired optical spectrum, adapting an optical modulator driver signal in a manner causing said difference to be reduced.

* * * * *